(12) United States Patent
Hogl (10) Patent No.: US 8,831,990 B2
(45) Date of Patent: *Sep. 9, 2014

(54) METHOD AND SYSTEM FOR A PAYMENT TRANSACTION ASSOCIATED WITH A DECLARATION OF INTENT (71) Applicant: Christian Hogl, Munich (DE)

(72) Inventor: Christian Hogl, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/941,807

(22) Filed: Jul. 15, 2013

(65) Prior Publication Data
US 2013/0304650 A1 Nov. 14, 2013

Related U.S. Application Data (63) Continuation of application No. 13/285,201, filed on Oct. 31, 2011, which is a continuation of application (Continued)

(30) Foreign Application Priority Data

Mar. 11, 2003 (DE) .................................. 103 10 527

(51) Int. Cl.
G06Q 20/04 (2012.01)
G06Q 20/10 (2012.01)
(Continued)

(52) U.S. Cl.
CPC ............. *G06Q 20/40* (2013.01); *G06Q 20/04* (2013.01); *G06Q 20/10* (2013.01); *G06Q 20/383* (2013.01); *G06Q 20/105* (2013.01); *G06Q 20/3674* (2013.01); *G06Q 20/02* (2013.01); *G06Q 20/367* (2013.01); *G06Q 20/223* (2013.01); *G06Q 40/00* (2013.01); *G06Q 50/265* (2013.01); *G06Q 20/102* (2013.01); *G06Q 30/0213* (2013.01); *G06Q 20/385* (2013.01); *G06Q 20/3223* (2013.01); *G06Q 20/3227* (2013.01); *G06Q 20/3229* (2013.01); *G06Q 20/1085* (2013.01); *G06Q 20/32* (2013.01)
USPC ............... 705/40; 705/39; 705/44; 705/26.1; 705/26.81

(58) Field of Classification Search
CPC ..... G06Q 20/04; G06Q 20/10; G06Q 20/102; G06Q 40/00; G06Q 20/02; G06Q 20/32; G06Q 20/40
USPC .................... 705/40, 44, 35, 39, 26.1, 26.81; 455/406; 526/279
See application file for complete search history.

(56) References Cited

U.S. PATENT DOCUMENTS 4,960,981 A 10/1990 Benton et al. .................. 705/41
5,122,950 A 6/1992 Benton et al. .................. 705/44
(Continued)

FOREIGN PATENT DOCUMENTS

CA 2 313 940 7/2000 ............. H04Q 7/38
CA 2 361 489 8/2000 ............. G07F 19/00
(Continued)

OTHER PUBLICATIONS

John Elliott, Signing on the Digital Line, IEE Review, pp. 222-225, Sep. 1999.*
(Continued)

*Primary Examiner* — Barbara Joan Amelunxen
(74) *Attorney, Agent, or Firm* — Kusner & Jaffe (57) ABSTRACT The present invention relates to a method and a system for initiating and/or conducting a transaction that is associated with at least two corresponding declarations of intent, in particular a payment transaction, between at least two transaction parties via a processing unit (3), in which payment transaction at least one of the transaction parties uses a land line telephone or mobile telephone (1, 2) or a mobile communications device for transmitting data. The method is characterized by the transmission of data to the processing unit by at least two transaction parties within a limited time frame, and by the fact that the initiation of the data transmission of these transaction parties is effected actively by the transaction parties and not by the processing unit (3), while the data transmitted during initiation contain features that enable correlating the declarations of intent with one another.

4 Claims, 4 Drawing Sheets

Related U.S. Application Data

No. 12/728,544, filed on Mar. 22, 2010, now Pat. No. 8,065,232, which is a continuation of application No. 10/548,492, filed as application No. PCT/EP2004/002520 on Mar. 11, 2004, now Pat. No. 7,702,581.

(51) Int. Cl.
| | |
|---|---|
| *G06Q 20/32* | (2012.01) |
| *G06Q 20/38* | (2012.01) |
| *G06Q 20/36* | (2012.01) |
| *G06Q 20/02* | (2012.01) |
| *G06Q 20/22* | (2012.01) |
| *G06Q 40/00* | (2012.01) |
| *G06Q 20/40* | (2012.01) |
| *G06Q 50/26* | (2012.01) |
| *G06Q 30/02* | (2012.01) |

(56) References Cited

U.S. PATENT DOCUMENTS

| | | | |
|---|---|---|---|
| 5,465,206 A * | 11/1995 | Hilt et al. | 705/40 |
| 5,703,949 A | 12/1997 | Rosen | 705/65 |
| 5,727,249 A * | 3/1998 | Pollin | 705/40 |
| 5,991,749 A * | 11/1999 | Morrill, Jr. | 705/44 |
| 6,198,915 B1 | 3/2001 | McGregor et al. | 455/406 |
| 6,199,761 B1 * | 3/2001 | Drexler | 235/487 |
| 6,289,323 B1 * | 9/2001 | Gordon et al. | 705/40 |
| 6,366,893 B2 | 4/2002 | Hannula et al. | 705/40 |
| 6,408,284 B1 * | 6/2002 | Hilt et al. | 705/40 |
| 6,424,249 B1 * | 7/2002 | Houvener | 340/5.82 |
| 6,464,134 B1 | 10/2002 | Page | 235/379 |
| 6,542,250 B1 | 4/2003 | Michaelis et al. | 356/601 |
| 6,615,193 B1 | 9/2003 | Kingdon et al. | 705/65 |
| 6,934,689 B1 | 8/2005 | Ritter et al. | 705/17 |
| 7,103,572 B1 * | 9/2006 | Kawaguchi et al. | 705/40 |
| 7,107,249 B2 | 9/2006 | Dively et al. | 705/74 |
| 7,127,427 B1 | 10/2006 | Casper | 705/44 |
| 7,158,955 B2 | 1/2007 | Dively et al. | 705/74 |
| 7,165,052 B2 | 1/2007 | Dively et al. | 705/74 |
| 7,319,855 B1 | 1/2008 | Brune et al. | 455/406 |
| 7,363,265 B2 | 4/2008 | Horgan | 705/35 |
| 7,366,695 B1 * | 4/2008 | Allen-Rouman et al. | 705/39 |
| 7,536,353 B2 | 5/2009 | Casper | 705/44 |
| 7,606,766 B2 | 10/2009 | Anderson et al. | 705/40 |
| 7,630,937 B1 * | 12/2009 | Mo et al. | 705/39 |
| 7,664,697 B2 | 2/2010 | Takayama | 705/39 |
| 7,835,971 B2 | 11/2010 | Stockton et al. | 705/37 |
| 8,069,115 B2 | 11/2011 | Schoenberg et al. | 705/40 |
| 2001/0016835 A1 * | 8/2001 | Hansmann et al. | 705/40 |
| 2001/0029486 A1 * | 10/2001 | Iwase | 705/40 |
| 2001/0032183 A1 * | 10/2001 | Landry | 705/40 |
| 2001/0037284 A1 * | 11/2001 | Finkelstein et al. | 705/37 |
| 2001/0037308 A1 * | 11/2001 | Kotlarsky | 705/64 |
| 2001/0044776 A1 * | 11/2001 | Kight et al. | 705/40 |
| 2002/0052842 A1 * | 5/2002 | Schuba et al. | 705/40 |
| 2002/0062281 A1 * | 5/2002 | Singhal | 705/39 |
| 2002/0065774 A1 | 5/2002 | Young et al. | 705/41 |
| 2002/0072958 A1 * | 6/2002 | Yuyama et al. | 705/10 |
| 2002/0073027 A1 * | 6/2002 | Hui et al. | 705/40 |
| 2002/0095357 A1 * | 7/2002 | Hunter et al. | 705/27 |
| 2002/0107007 A1 | 8/2002 | Gerson | 455/414 |
| 2002/0143638 A1 * | 10/2002 | August et al. | 705/26 |
| 2002/0143655 A1 * | 10/2002 | Elston et al. | 705/26 |
| 2002/0152179 A1 | 10/2002 | Racov | 705/67 |
| 2002/0161708 A1 | 10/2002 | Offer | 705/44 |
| 2002/0174074 A1 * | 11/2002 | Meadow et al. | 705/71 |
| 2002/0198835 A1 * | 12/2002 | Watson | 705/40 |
| 2003/0026396 A1 * | 2/2003 | Weik et al. | 379/93.12 |
| 2003/0028484 A1 * | 2/2003 | Boylan et al. | 705/40 |
| 2003/0050081 A1 | 3/2003 | Huber | 455/466 |
| 2003/0050854 A1 * | 3/2003 | Showghi et al. | 705/26 |
| 2003/0074209 A1 * | 4/2003 | Tobin | 705/1 |
| 2003/0097444 A1 * | 5/2003 | Dutta et al. | 709/225 |
| 2003/0130942 A1 * | 7/2003 | Campbell et al. | 705/40 |
| 2003/0229590 A1 * | 12/2003 | Byrne et al. | 705/40 |
| 2004/0030645 A1 * | 2/2004 | Monaghan | 705/40 |
| 2004/0030647 A1 * | 2/2004 | Hansen et al. | 705/40 |
| 2004/0083168 A1 | 4/2004 | Kuth et al. | 705/40 |
| 2004/0083170 A1 * | 4/2004 | Bam et al. | 705/40 |
| 2004/0128244 A1 * | 7/2004 | Dojo et al. | 705/40 |
| 2004/0139015 A1 * | 7/2004 | Luttge | 705/40 |
| 2004/0199474 A1 * | 10/2004 | Ritter | 705/65 |
| 2004/0243515 A1 * | 12/2004 | Kurihara et al. | 705/41 |
| 2004/0249751 A1 * | 12/2004 | Luttge | 705/40 |
| 2005/0086164 A1 * | 4/2005 | Kim et al. | 705/40 |
| 2005/0102230 A1 * | 5/2005 | Haidar | 705/40 |
| 2005/0187873 A1 * | 8/2005 | Labrou et al. | 705/40 |
| 2005/0209964 A1 | 9/2005 | Allen et al. | 705/40 |
| 2005/0222949 A1 * | 10/2005 | Inotay et al. | 705/40 |
| 2006/0206425 A1 | 9/2006 | Sharma | 705/40 |
| 2006/0293971 A1 * | 12/2006 | Hunter et al. | 705/26 |
| 2007/0016523 A1 * | 1/2007 | Blair et al. | 705/40 |
| 2007/0255620 A1 | 11/2007 | Tumminaro et al. | 705/14 |
| 2007/0265984 A1 | 11/2007 | Santhana | 705/65 |
| 2008/0040265 A1 | 2/2008 | Rackley, III et al. | 705/40 |
| 2008/0195541 A1 | 8/2008 | Battaglini et al. | 705/43 |
| 2009/0182666 A1 * | 7/2009 | Geer | 705/45 |
| 2009/0192940 A1 * | 7/2009 | Mann et al. | 705/44 |
| 2009/0204546 A1 * | 8/2009 | Haidar | 705/75 |
| 2009/0248526 A1 * | 10/2009 | Park et al. | 705/14.15 |
| 2013/0132274 A1 | 5/2013 | Henderson et al. | 705/41 |

FOREIGN PATENT DOCUMENTS

| | | | | |
|---|---|---|---|---|
| DE | 199 03 822 a1 | | 8/2000 | G07F 19/00 |
| DE | 199 05 054 A1 | | 8/2000 | H04M 15/00 |
| DE | 199 34 981 A1 | | 2/2001 | H04Q 7/38 |
| DE | 199 46 539 A1 | | 4/2001 | H04L 12/16 |
| DE | 100 08 280 C1 | | 6/2001 | G07F 7/00 |
| DE | 100 39 569 C1 | | 12/2001 | G07F 7/08 |
| DE | 100 40 799 A1 | | 4/2002 | G07F 19/00 |
| EP | 1 026 643 | | 8/2000 | G07F 19/00 |
| EP | 1 081 919 A1 | | 3/2001 | H04L 29/06 |
| EP | 1 231 578 A2 | | 1/2002 | G07F 19/00 |
| EP | 0 708 547 B1 | | 5/2002 | H04M 17/02 |
| EP | 0 992 025 A2 | | 7/2002 | G07F 7/00 |
| EP | 1 282 087 A1 | | 2/2003 | G06Q 20/00 |
| EP | 1 367 516 A1 | | 12/2003 | G06F 17/60 |
| GB | 2 372 615 A | | 8/2002 | G07F 19/00 |
| JP | 2001306966 | | 11/2001 | G06F 17/60 |
| JP | 2001331561 | | 11/2001 | G06F 17/60 |
| WO | WO 00/60845 | | 10/2000 | H04M 15/00 |
| WO | WO 01/31594 A1 | | 3/2001 | G07F 7/10 |
| WO | WO 01/65798 A1 | | 9/2001 | H04L 29/06 |
| WO | WO 01/93218 A1 | | 12/2001 | G07F 19/00 |
| WO | WO 02/17158 | | 2/2002 | G06F 17/60 |
| WO | WO 02/50788 | * | 6/2002 | G07F 19/00 |
| WO | WO 02/071353 A1 | | 9/2002 | G07F 19/00 |
| WO | WO 03/009243 | | 1/2003 | G07F 19/00 |
| WO | WO 2004/081892 | | 3/2004 | G07F 19/00 |

OTHER PUBLICATIONS

German Search Report for German Patent Application No. 103 10 527.1, Mar. 9, 2004.

International Search Report for Int'l Application No. PCT/EP2004/002520, Jan. 9, 2004.

Nils Diezmann: *Sicherheit und Zahlung per Handy*, Internet Article, Online!, Retrieved from the Internet URL: http://www.firstsurf.com/diez0151_t.h., Dec. 17, 2001, (Cited in the International Search Report for Int'l Application No. PCT/EP2004/002520) Machine language translation included.

Manhart K: *Bezahlen per Handy* Funkschau, Franzis-Verlag K.G. Munchen, DE, vol. 73, No. 15, Jul. 7, 2000, pp. 40-42. (Cited in the International Search Report for Int'l Application No. PCT/EP2004/002520).

Chan, H. et al.: *E-Commerce: Fundamentals and Applications*, Wiley & Son, NY, USA, 2001, ISBN 0 471 49303 1, Chapter 10, pp. 285-313. (Cited in the German Search Report for German Patent Application No. 103 10 527).

(56) References Cited

OTHER PUBLICATIONS

Elliot, J.: *Signing on the digital line*, IEE Review, vol. 45, Issue 5, 1999, pp. 222-225. (Cited in the German Search Report for German Patent Application No. 103 10 527).

Insik Hong et al.: *The implementation of electronic money for e-commerce using Java card*, International Symposium on Industrial Electronics ISIE 2001, vol. 2, Jun. 2001, pp. 1369-1372. (Cited in the German Search Report for German Patent Application No. 103 10 527).

Merriam-Webster Online Dictionary, $10^{th}$ Ed., Def. Proximate.

Mario B. Lamberte, The Philippine Payment System: Efficiency and Implications for the Conduct of Monetary Policy, Philippine Institute for Development Studies, Discussion Paper Series No. 2001-20, Makati city, Philippines, Nov. 2001.

* cited by examiner

METHOD AND SYSTEM FOR A PAYMENT TRANSACTION ASSOCIATED WITH A DECLARATION OF INTENT

RELATED APPLICATIONS

This application is a continuation of U.S. application Ser. No. 13/285,201, filed Oct. 31, 2011, which is a continuation of U.S. application Ser. No. 12/728,544, filed Mar. 22, 2010 (now U.S. Pat. No. 8,065,232), which is a continuation of U.S. application Ser. No. 10/548,492, filed Jun. 16, 2006 (now U.S. Pat. No. 7,702,581), which is a U.S. National Stage Application of International Application No. PCT/EP04/02520, filed Mar. 11, 2004, which claims priority from German Patent Application No. 103 10 527.1, filed Mar. 11, 2003, said patent applications hereby fully incorporated herein by reference.

FIELD OF THE INVENTION

The present invention relates to a method and a system for initiating and/or conducting a transaction that is associated with at least two corresponding declarations of intent, in particular a payment transaction, between at least two transaction parties via a processing unit, wherein at least one of the transaction parties uses a land line telephone or mobile telephone or a mobile communication device for transmitting data.

Payment transactions represent the main field of application of the present invention because of their frequency and commercial significance.

BACKGROUND OF THE INVENTION

Several methods for conducting payment transactions with the aid of a mobile telephone are known. The advantages of these methods are described in e.g. DE19903822.

These methods are generally designed in such a way that the transaction parties exchange data with a processing unit or, optionally, with each other.

In this connection, a distinction must be made between two types of method, which are referred to in the following as "A-type standard-compatible method" and "B-type future-dependent methods".

"A-type standard-compatible methods" relate to those methods which can be implemented with the entire currently installed base of mobile telephones (i.e. with all or with the predominant majority of the mobile telephones/SIM module chip cards in circulation according to the state of the art) without necessitating the replacement or technical modification of said mobile telephones or SIM module chip cards.

"B-type future-dependent methods" relate to those methods that can only be implemented with special mobile telephones and SIM modules (generally of the latest model) which are still only in limited circulation or will only be marketed at a future point in time.

In type-B future-dependent methods the exchange of data generally occurs for at least one of the transaction parties via protocols and/or methods such as WAP (Wireless Application Protocol) or i-mode (predominantly in circulation in Japan), as well as via Java or SIM toolkit applications executed locally on a mobile telephone or SIM module chip card, the exchange of data occurring e.g. via GPRS (GSM Packet Radio Service).

A disadvantage of the type-B future-dependent methods is that they are dependent on the penetration and success of the technological infrastructure upon which they are based. An operator that would like to introduce such a method is faced with the choice of relying on a very small potential user basis or trying to induce potential users (e.g. with subsidies) to acquire new mobile telephone end devices. This represents a very large hurdle for the introduction of such a method.

Another disadvantage of the type-B future-dependent methods is that they can generally only be implemented in mobile wireless networks of a certain standard (such as e.g. GSM) and not with simple land line telephones.

In type-A standard-compatible methods the exchange of data generally occurs for at least one of the transaction parties via a live telephone connection with voice responses (e.g. by means of an IVR system (Interactive Voice Response)) and DTMF tone transmission (Dual Tone Multi-Frequency) or by SMS (Short Message System). These methods are generally effected through the transmission of the complete mobile telephone number (ANI/MSISDN) or a unique alias from the payer and/or payee to the payee and/or payer, the transmission of a permanently valid PIN code from the payer to a processing unit for authentication and, optionally, the transmission of a temporarily valid TAN code as proof of authorization and payment from the processing unit to the payer and from the payer to the payee.

One of these methods, the so-called Paybox method, is known from the second example of DE 199 03 822. This method is briefly illustrated here as an example of a type-A standard-compatible method:

The payer (called P in the following) first verbally transmits his mobile telephone number (ANI and/or MSISDN) or an alias clearly correlated to his mobile telephone number to the payee (recipient) (R). R then implicitly transmits his mobile telephone number by way of a telephone call from his mobile telephone, and explicitly transmits the mobile telephone number of P, as well as the amount to be paid, by way of DTMF tone transmission to a processing unit (PS). (A telephone connection between R and PS remains established until the final step). The processing unit then examines whether P is an authorized participant and whether the credit rating of P is sufficient for payment of the amount in question. The PS then initiates a call to the mobile telephone number of P. P accepts the call. A voice computer of the PS generates an acoustic message with the payment information (recipient, amount payable). To confirm and authorize the payment, P enters a PIN code using DTMF tone transmission. Upon successful authorization, the PS acoustically transmits to R a confirmation of payment via the still operative telephone connection.

The disadvantages of the Paybox method are above all the high telecommunications costs and the protracted duration of the transaction.

In the Paybox method the call from R to PS and the transmission of the data takes approx. 30 seconds. Of approximately the same length is the following call of PS to P including the announcement of the payment details and retrieval of the authorization PIN. The connection from the first call remains established during the second call. Altogether, telecommunication costs for 90 seconds of mobile telephone connections are incurred. If the transaction is effected by way of a toll-free telephone number and the operator of the PS bears the telecommunications costs, the latter currently incurs costs of approx. 30 euro cents as a result.

Thus, the implementation of the Paybox method is generally not commercially viable for smaller payment transactions.

Altogether, processing a transaction with the Paybox method takes approx. 75 seconds.

Thus, the implementation of this method in all time-critical mobile commerce application scenarios such as e.g. payments at point-of-sale terminals in retail is very problematic.

The disadvantages of the Paybox method illustrated with this example also apply in a similar manner to many other type-A standard-compatible methods.

E.g. the time restriction remains even when alternative transmission methods such as SMS are used. For example, the delivery speed of an SMS is not guaranteed and can often take up to 30 seconds, in some cases considerably longer. Additionally, depending on the method, the time required to enter and send an SMS has to be considered. (The same applies to certain type-B future-dependent methods, e.g. the use of WAP protocol—the time required to establish a connection, navigate and enter data is too long for use in time-critical mobile commerce scenarios).

Another disadvantage of said type-A standard-compatible method is that the complete mobile telephone number of the payer and/or payee has to be disclosed to the payer and/or payee. As a result, there is no anonymity between the transaction parties. The use of a telephone number alias (such as e.g. in the Paybox method) may provide a partial anonymity with respect to the actual mobile telephone number of the participant; however, principally, the unique identity of one transaction party is known to the other transaction party.

Another disadvantage of the use of a complete mobile telephone number or a telephone number alias is their length (generally 12 digits) and the resulting longer duration of entry and transmission, as well as the probability of mis-types.

Yet another disadvantage of said type-A standard-compatible method is the low degree of probative force and/or the risk of repudiation for the payer, the payee and the operator of the processing unit. One possibility for increasing probative force consists in the involvement of a "trusted third party", i.e. an additional party recognized by the payer, the recipient and the operator of the processing unit. The telecommunications provider is particularly suitable to act as such an additional party. However, records of the content of data transmitted via an established telephone or WAP data connection, as well as of the content of an SMS, can generally not be kept by the telecommunications provider owing to legal regulations. Thus, generally, merely the telephone numbers of the communications partners, the time and duration of the communication as well as the amount of data transmitted are recorded. The fact that a transaction has been processed can thus principally be relatively readily proven. Should, however, a dispute with regard to the amount of the authorized amount arise, probative force is problematic. As a consequence, it is generally necessary in methods such as Paybox to e.g. send an SMS for confirmation purposes in order to reduce the probability of error and avoid future complaints, thereby generating further costs.

Another disadvantage of said type-A standard-compatible method is that it easy to make errors regarding the authorized amount. This risk arises because generally the amount is actively specified by one of the transaction parties only, and then merely passively confirmed by the other transaction party, e.g. after the amount has been displayed on the mobile telephone display or announced acoustically.

A method for billing internet transactions via mobile telephone systems is known from DE 199 46 539 A1. The association of retailer and customer in a payment gateway is accomplished using a temporary IP address of the mobile telephone of the customer. This IP address is namely transmitted to the payment gateway by both customer and retailer. The disadvantage of this method is that the matching of the temporary IP address of the mobile telephone subscriber with his MSISDN has to be effected via an MSISDN-IP databank, which makes the implementation of the method difficult, if not impossible for a payment gateway operator that is independent of the mobile telephone provider. Another disadvantage of this method is that the customer has to have a WAP-capable mobile wireless device at his disposal; the method is thus a "type-B future-dependent method" (see above). In addition, the establishment of a WAP internet connection is very time-consuming, and, therefore, the method is not suitable for most payment scenarios. Moreover, this method has the disadvantage that a relatively sizeable data set, namely the temporary IP address of the mobile wireless subscriber, must be transmitted for correlating retailer and customer. Finally, correlating the IP addresses entering the payment gateway is complex, as a very large number of IP addresses may have to be compared.

Finally, a method for authorizing the payment of goods offered on the Internet is known from EP 1 081 919 A1. Here, correlating customer and provider is effected with an authorization comparator by means of a transaction code that is generated by the provider and transmitted to the customer. This, however, gives rise to the disadvantage that the handling of the transaction codes, which vary for both transaction parties from transaction to transaction, is inherently complex. As a result, the, in total, triple transmission of the transaction code (from the provider to the authorization comparator, from the provider to the customer and from the customer to the authorization comparator) is highly prone to error. To safeguard against a transaction code error (and unintentionally "mismatching" another open transaction), or even to safeguard against a general error e.g. with regard to the authorized sum, a further enquiry from the authorization comparator to the customer is necessary (see column 8 lines 47-55 of the published patent application) before the transaction can be conducted. This renders the method considerably slower and more expensive so that almost all of the disadvantages of the above-mentioned Paybox method also apply to this method. Moreover, the generation of a reliably unique transaction code is so complex that a special algorithm at the retailer's terminal becomes a practical necessity, which entails a restriction to e.g. Java-capable mobile telephones. Thus, this is also one of the disadvantageous "type-B future-dependent methods" (see above). Finally, the disadvantage also arises here that a relatively sizeable data set must be transmitted for correlating retailer and customer while the required examination is complex, as a very large number of transaction codes may have to be compared.

SUMMARY OF THE INVENTION

The object of the present invention is thus to provide a method and a system for initiating and/or conducting a transaction that is associated with at least two corresponding declarations of intent, in particular a payment transaction, between at least two transaction parties via a processing unit, wherein at least one of the transaction parties uses a land line telephone or mobile telephone or a mobile communication device for transmitting data, and which solves the aforementioned problems. This means in particular that the method and the system should be capable of being implemented with all or the predominant majority of mobile telephones/SIM-module chip cards in circulation according to the state of the art, in mobile wireless networks with different standards, as well as with simple land line telephones and that, further, a short transaction duration, low transaction costs, the mutual anonymity of the transaction parties, a low probability of error and high degree of probative force are provided.

According to the present invention, at least two of the transaction parties transmit data to the processing unit, while the transmission of the data occurs within a restricted time frame (interval). The initiation of the data transmission of these transaction parties is conducted actively by the transaction parties and not by the processing unit, while the data transmitted upon initiation contain features that enable correlating the declarations of intent.

The feature of the initiation of the data transmission by the transaction parties means that no transmission of data relevant to the transaction from the processing unit to the transaction parties is effected before the initial transmission of the data relevant to the transaction from the transaction parties to the processing unit.

In the present invention, unit is understood to be a piece of technical equipment, such as e.g. data processing equipment. Application programs that execute the steps of the method automatically can be stored on this equipment. In the following, the processing unit is also called computer system. On the side of the transaction parties, land line telephones, mobile telephones and/or communication devices are envisaged for the transmission of data. In order to conduct the method according to the invention, it is sufficient to enter data corresponding to a declared intention into these devices. In a payment transaction, it is sufficient, for example, if the amount to be paid is entered. The remaining data, which identify e.g. the transaction parties, can be stored on the devices and transmitted automatically to the processing unit.

In general, the method according to the invention serves the purpose of initiating and/or conducting a transaction that is associated with at least two corresponding declarations of intent. The declarations of intent can in particular be directed to the conclusion of a contract. The transaction to be initiated or conducted in this case is thus the conclusion of a contract. For example, a conventional credit card payment effected separately can be the object of the declaration of intent and/or the conclusion of the contract.

The transmission of the data is effected simultaneously and within a limited time frame (interval). The duration and cost of the transaction is reduced by the simultaneous data transfer proceeding from the transaction parties toward the processing unit. In conventional methods such as e.g. Paybox, a sequential data transfer generally occurs; in the case of a payment transaction, first from the payer to the payee, then from the payee to the processing unit, then from the processing unit to the payer, then from the payer back to the processing unit, and from the latter back to the payee.

Owing to the simultaneous and/or proximate data transfer actively initiated by the transaction parties towards the processing unit, only a few feature-data have to be transmitted in order to enable correlating the declarations of intent and, thus, of the transaction parties, for the narrow time frame limits the size of the pool of transactions to be correlated. By reducing the amount of data a further simplification and acceleration of the transaction is achieved while facilitating the anonymity of the transaction parties among one another.

By means of the simultaneous and/or proximate data transmission an increase in the security against repudiation is further achieved, as, unlike methods in which a transaction can be initiated or generated by one party alone, the active and simultaneous participation of two transaction parties is required. This also leads to greater security against unintentionally generating a transaction or unintentionally generating the same transaction twice.

The time interval for the transmission of the data depends on the transaction and devices used for this purpose as well as the number of data arriving at the processing unit per unit of time. The length of the time interval can be, for example, 5 minutes; preferably, it is shorter. If the transaction is initiated by means of two mobile telephones, the time interval is e.g. in the range of 10 and 30 seconds, preferably 20 seconds.

According to a further preferred embodiment of the method according to the invention, the data transmission of at least one of the transaction parties is effected by means of the initiation of a telephone call to the transaction unit. Here, initiation of a telephone call designates, first, that the data transmission is initiated by the transaction parties and not by the processing unit; second, the dialing of the number of the processing unit, irrespective of whether or not the processing unit accepts the call. Different data can be transmitted already when the number is dialed; for example, the identifier of the caller and the identifier of the called party, as well as additional features such as post-dialing digits. A toll connection is normally only established when the call is accepted by the called party. In the case of the initiation of a call, the call can be accepted; it does not, however, necessarily have to be.

According to a further preferred embodiment of the method according to the present invention, the transmission of at least a part of the data transmitted by at least one of the transaction parties is effected by means of the telephone number digit sequence dialed when establishing a telephone call to the processing unit. For this purpose the telephone number digit sequence is preferably so short that it can be transmitted completely by the switching centres and/or transmission systems. The implicit transfer of the relevant data as a part of the called number has the advantage that it is secure, fast and easy to use. Generating a payment transaction is in fact as simple as dialing a telephone number, while the safety functions built into mobile telephones, which prevent unintentional or unauthorized dialing, also protect the payment function. Moreover, this embodiment has the advantage that the itemized bill of the telecommunications provider can also act as proof of payment or as a receipt, and that it is possible to simply integrate the payment transaction into the billing systems of the telecommunications provider. A further advantage of a data transmission as part of the called number lies in the fact that—unlike DTMF tone transmission—visual verification (before sending the data) using the display of the mobile telephone is possible. Moreover, this type of transmission is considerably less prone to error than DTMF tones, which often lead to problems in cases of poor wireless connections. In any case, any number of transmission methods are conceivable for transferring data either from the transaction parties to the processing unit or from the processing unit to the transaction parties; the scope of this invention includes these as well. The methods of transmission can be implemented either entirely or partially as an alternative or as a complement to the methods described above. In the case of a payment transaction, for example, the transmission of the amount, a PIN, a customer number, a payment correlation reference code or other information can be effected with one or several alternative methods.

According to a further preferred embodiment of the method according to the present invention, the data transmitted by one transaction party are just sufficient to enable the identification of this transaction party, yet not sufficient to enable the identification of the other transaction party.

According to a further preferred embodiment of the method according to the present invention, the data transmitted by the transaction parties to the processing unit are associated with one another in accordance with a set rule.

In the method according to the present invention it is enough if Party A reveals, for example, only the last n digits of his mobile telephone number, i.e. only a part of his phone number. Party B then transmits his own mobile telephone number and said n digits to the processing unit. Simultaneously, Party A transfers only his own mobile telephone number to the processing unit. As a result of the narrow time frame, the pool of transactions to be correlated is so small that the n digits are sufficient for the correlating. (The n digits that Party B transmits are not sufficient to identify Party A; moreover, the n digits are associated with the mobile telephone number of Party A in accordance with a set rule). Alternatively, the method can operate in such a way that both Parties A and B reveal e.g. the last n and/or m digits of their respective telephone numbers to each other. In the Paybox method illustrated above, which does not work with a simultaneous transmission, Party A must reveal his entire mobile telephone number or a unique alias to Party B in order to enable unique addressing.

By means of these features the anonymity of the transaction parties between each other is safeguarded while correlating capability is maintained. The transaction parties are, however, clearly identified to the processing unit, which opens up the principle possibility, e.g. in a dispute, and with the consent of the transaction parties, of mediating between the latter and establishing contact between them.

According to a further preferred embodiment of the method according to the present invention, the data transmitted by the transaction parties to the processing unit contain the essential part of the contents of the respective declarations of intent and/or a digital digest (hash value) of the contents of the declarations of intent and/or a clear reference, if necessary, to the contents of the respective declarations of intent recorded elsewhere.

According to a further preferred embodiment of the method according to the present invention, a verification unit, which is comprised by or connected to the processing unit, examines whether or not correlating the transaction parties is possible on the basis of the transmitted data. In a payment transaction, this also involves an examination of whether or not the respective declarations of intent correspond.

According to a further improvement of the method according to the present invention, the data transmission from the transaction parties to the processing unit is conducted via mobile telephones, and information on the locations of the mobile telephones is also transmitted during the transmission of data. This information is used as an additional criterion of correlation. This improvement is advantageous in implementation scenarios in which a spatial proximity exists between payer and payee. In this case, the information on the location of the transaction parties can be used as an additional criterion in order to facilitate correlating the transaction parties on the basis of the data sets in the transaction pool. The notion "location-dependent services" comprises methods in which location information of mobile telephone users can be transmitted and evaluated.

According to a refinement of the method according to the present invention, the processing unit can request the entry of additional features, e.g. can ask the payer via an IVR system (Interactive Voice Response) to enter the last four digits of the mobile telephone number of the recipient, in the rare cases in which a unique correlation is not possible owing to the presence of several data sets with corresponding criteria.

According to a further preferred embodiment of the method according to the present invention, a transaction unit that is comprised by or connected to the processing unit is provided. The transaction unit examines whether it is possible to conduct the payment transaction. In cases of positive verification the transaction is conducted.

According to a refinement of the method according to the present invention, the transaction to be initiated or conducted further comprises at least the documentation of the conclusion of a contract, i.e. e.g. the storage of data relating to the transaction.

Furthermore, embodiments of the method in which a telephone connection is established between both transaction parties (provided that both transaction parties are using a land line telephone or mobile telephone) are also possible. This variant makes sense in particular when e.g. a payment transaction for a telephone consultation or the like is effected and the service is rendered immediately via the established telephone connection. For cases in which e.g. a payment transaction between the transaction parties is to be effected via mobile telephones over the existing mobile telephone connection, the method could be modified in such a way that the transmission of the amount to be paid and the last four digits of the mobile telephone number of the payer is effected by means of DTMF tones, which are emitted during the connection by the transaction parties. In this case, the DTMF tones could be filtered out by the switching centre and relayed to the processing unit, or a temporary telephone connection between the transaction parties and the processing unit could be initiated.

According to a further preferred embodiment of the method according to the invention, a signaling unit that can be comprised by or connected to the processing unit is provided. In cases of negative verification by the verification unit, the signaling unit sends an error message to both parties. This can be effected e.g. through the acceptance of the calls and acoustic announcement. The signals triggered by the signaling unit and/or data transmitted by the signaling unit can allow the transaction parties to draw inferences in particular with regard to the status of the transactions being processed by the transaction unit (as well as with regard to the results of the verification unit).

In general, the signaling unit transmits data signaling that the transaction has been conducted to at least one of the transaction parties after completion of the transaction.

These signals are advantageously effected as follows:

After both calls have arrived at the processing unit, all verification and processing steps are first conducted by the verification unit and transaction unit. During this time the calls are not accepted by the processing unit, i.e. a call connected signal is signalled to the transaction parties at first, thereby advantageously reducing the telecommunications costs.

Further, both calls can be accepted by the processing unit once a final status has been attained (i.e. there is an error or all preliminary verification steps prior to the conducting of the payment are complete). If an error has occurred, a short announcement with the cause of the error (e.g. "limit for single payment exceeded" or "corresponding payee not found") is made, with the processing unit then immediately hanging up. If the payment can be conducted, a longer announcement (e.g. "payment of EUR 23.50 effected now") is made, followed by an acoustic signal and then an optional announcement of account balance. This embodiment has the following advantage: unsuccessful transactions always entail a connection duration of e.g. 5 seconds or less; only successful transactions entail a connection duration of e.g. 10 seconds or longer.

Moreover, embodiments of the method in which signaling is generally effected by initiation of a call-back to at least one of the transaction parties are possible. This variant has the advantage that records for the conducted transactions are listed also on the itemized bills of the operator of the signaling unit and/or processing unit. This variant using a call-back can in turn be designed in such a way that the intervals between different call connect signals and/or call disconnect signals are of various length. This way, e.g. the call-back can be effected after 10 seconds in the case of a successful transaction and 20 seconds in the case of an unsuccessful transaction, or the call-back can be effected immediately in both cases and a longer announcement (prior to disconnection by the signaling unit and/or processing unit) can be made in the case of a successful transaction than would occur in the case of an unsuccessful transaction.

According to a further preferred embodiment of the method according to the invention, it is also possible to design a variant using a call-back in which signaling is effected through the generation and transmittal of a special caller ID telephone number (ANI) by the processing unit when initiating the call-back, this ANI permitting inferences regarding the results of the verification unit and/or status of the transaction being conducted by the transaction unit.

Furthermore, the variant using a call-back and, optionally, a special caller ID telephone number can advantageously be designed in such a manner that the calls-back initiated by the processing unit are only signaled on the telecommunications devices of the transaction parties, but not accepted by them. This embodiment is advantageous in that theoretically no telecommunications costs are incurred at all.

According to a further preferred embodiment of the method according to the invention, the emission of the acoustic signal described above and/or signals to both parties is effected exactly synchronously and additionally, in particular, precisely at the moment that the actual payment transaction is logically effected (expressed in computer-technical language: at the moment the "commit" of the transaction is effected, which represents the actual payment transaction). This way, the probability of scenarios in which no clear indication of the success or status of the transaction can be made to one or all transaction parties is reduced. (Such scenarios can e.g. occur when the telecommunications connection is severed during the processing of the transaction.)

The embodiment that the duration of a connection of a successful transaction is longer than that of an unsuccessful transaction has the advantage that the transaction is broken off if one of the transaction parties hangs up prematurely, and the "commit" of the actual payment transaction is not executed. This way manipulation by hanging up prematurely, with the effect described above on the itemized bill, is precluded. (Such a manipulation would be possible if a long connection duration were an indication of an unsuccessful, and a short connection duration an indication of a successful transaction.)

According to a further preferred embodiment of the method according to the invention, signaling is effected by means of the acceptance of the call by the processing unit by picking up, or the processing unit does not accept the call while a call connected signal is signaled, or a busy signal or other signal is signaled, or by means of intervals of various length between the different call connect signals and/or call disconnect signals. For example, the method could work in such a way that a triple call connected signal is generated in case of a successful transaction before the busy signal sounds, whereas a busy signal sounds immediately after the call connected signal in case of an unsuccessful transaction. This embodiment has the advantage that theoretically no telecommunications costs whatsoever are incurred.

Furthermore, the method could work, for example, in such a way that signaling is effected either alternatively to or in combination with the call connected or busy signals via other toll-free announcements such as e.g. "The number you have dialed is not in service" or special toll-free messages to be introduced.

Also, the probability of complaints, as well as the general risk of misuse, can be reduced in the method according to the invention in all billing variants by transmitting information on previous transactions to the transaction parties in combination with the signaling of successful transactions. This means e.g. that a short announcement of the balance of the "stored value account" and/or the aggregate sum of individual transactions effected since the most recent billing can be made. Security is additionally increased through the announcement of the data and amount of the most recent transaction.

If both transaction parties are using a telephone and/or mobile telephone, the transmission of data and/or signals can be entirely or partially effected by multi-frequency tones (DTMF) and/or IVR systems (Interactive Voice Response) and/or via speech recognition systems and/or by speech and/or via SMS short messages and/or via the USSD protocol (Unstructured Supplementary Services Data) and/or via a WAP protocol (Wireless Application Protocol) and/or via the GPRS protocol (GSM Packet Radio Service) of the GMS standard and/or a comparable protocol of another mobile wireless standard and/or via an i-mode protocol and/or by using a Java and/or SIM-application-toolkit application and/or by using a Bluetooth interface and/or an infrared interface. A disadvantage of the use of DTMF tones, IVR systems, speech recognition systems, speech and SMS messages is the longer processing duration in comparison with the data transmission as part of the called number of a telephone call. A disadvantage of the use of a USSD protocol is the different implementation of status messages in different end devices and the fact that USSD (in the variant of USSD stage 2) is not supported by all mobile wireless network operators, as well as the fact that implementation by a provider independent of a mobile wireless network operator is not always possible. A disadvantage of using WAP, GPRS, i-mode, Java, SIM application toolkit and similar methods is that they—unless an exchange of end devices is effected and, optionally, the mobile wireless network operator or rates are changed—can only be used by a relatively small or very small part of mobile wireless users.

If only one of the transaction parties is using a telephone and/or mobile telephone, the transmission of data and/or signals can be entirely or partially effected via a computer network and/or via the Internet and/or by e-mail and/or via invoking a web service and/or by using an HTTP and/or XML protocol and/or by using a Bluetooth interface and/or an infrared interface and/or a wireless LAN and/or via a digital or analog modem and/or by means of some other transmission method.

The method according to the invention relates in particular to payment transactions. Here, the declarations of intent are generally at least directed to conducting a payment transaction associated with money or value units. Value units can be e.g. or in particular bonus points in discount systems, "status miles" or the like. Advantageously, bonus points and the like can be debited or credited in parallel to payment transactions associated with monetary units. The transaction in these cases consists at least in the instigation or conducting of a transaction associated with money or value units. The transaction unit then processes the payment transactions associated with money or value units. Subsequent processing of the payment transaction by the transaction unit can be effected by means of authentication and/or aggregation and/or a simultaneous or delayed, online or offline relay to other processing units. For example, single transactions can be collected on the side of the payer and/or payee and only debited or credited as a lump sum from or to a bank or credit card account on a monthly basis. In this case, the collective orders are sent to banks or credit card companies as further processing units. Alternatively, single transactions (especially of larger amounts) can be simultaneously relayed to a credit card company for online authorization.

According to a further preferred embodiment of the method according to the invention, in the case of a payment transaction, the transmitted data contain the amount to be paid in money or value units. By transferring the relevant data twice, the probability of error is decreased, while probative force is increased. In conventional methods, the amount is generally actively indicated by only one of the transaction parties and passively confirmed by the other transaction party, i.e. after the amount has been displayed on the mobile telephone display or announced acoustically. As a result, errors regarding the authorized amount are likely. It can thus occur e.g. in the Paybox method that the merely acoustically announced amount is not understood or misunderstood owing to a poor wireless connection or background noise. Furthermore, through the sharing of common information in the form of the amount, as well as through the double indication of this amount, a kind of attestation is effected by both transaction parties. Thus, an additional increase in security against repudiation is provided.

According to a refinement of the method according to the invention, a payment correlation reference code that enables or facilitates uniquely correlating the transaction parties is additionally transmitted.

According to a preferred embodiment of the method according to the invention, the amount to be paid could be transmitted as an encoded digit sequence instead of as plain text, and/or could be supplemented with a check digit or check digit sequence.

According to a further preferred embodiment of the method according to the present invention, the specification of the amount to be paid is effected by means of the active entry of the amount, and not by means of the passive confirmation of an amount displayed or announced. Advantageously, this leads to a reduction in the probability of error.

According to a refinement of the method according to the present invention, it is also possible to request additional features that facilitate a separate registration or classification of the executed transaction for the purposes of account-keeping, e.g. by means of an announcement such as "Press 1 for a private payment, 2 for a commercial payment".

According to a refinement of the method according the present invention, it is further possible to request features that facilitate the assignment of the transaction to user-specific subsidiary accounts, e.g. by entering different PINS for different users, in cases in which several users are conducting transactions using a mobile or land line telephone.

Instead of PINs, the retrieval of additional authorization features can be effected through other methods, e.g. biometric methods such as voice sampling.

Also, distinctions regarding further processing can be made according to set criteria. For example, small amounts can be charged automatically to a "stored value account", intermediate amounts added together and charged to a bank account after a delay, and larger sums authorized online by a credit card company. Different approaches can be implemented for storing and administering the transaction history, depending on the billing mode. Thus e.g. transactions with smaller amounts can, in case of complaints, be stored in the short term only or not at all, and those with larger amounts can be stored over longer periods of time. It is further possible to give the user the option of deciding for each transaction which billing mode he would prefer, i.e. by means of an IVR-based query ("Press 1 to have this payment charged to your credit card, 2 to have it debited from your account").

According to a further preferred embodiment of the method according to the invention, e.g. the transaction can be signaled and confirmed in different ways depending on the amount involved. Thus, an SMS could additionally be sent as confirmation following a successful transaction e.g. when larger amounts are involved.

According to a preferred example of the method according to the present invention, the transactions parties comprise a payer and/or a telephone of the payer, and a payee and/or the telephone of a payee. The following steps are conducted:

a) the payer initiates a telephone call to the processing unit, the dialed telephone number containing a digit sequence corresponding to the amount to be paid, b) simultaneously with or shortly before or after the call of the payer, the payee transmits data containing the amount to be paid to the processing unit, c) a verification unit examines whether the data transmitted by the payer and payee can be uniquely correlated and whether at least the amounts to be paid contained therein correspond, d) a transaction unit examines whether an identification and/or authentication of the payer and payee is possible on the basis of the data transmitted and/or whether it is possible to process the payment transaction.

e1) in case of positive verification by the verification unit and transaction unit
the transaction unit conducts or initiates further processing,
the call of the payer is accepted by a signaling unit and, optionally, an acoustic announcement conveying the message that payment has been effected is made,
a confirmation signal as to the successful payment is transmitted to the payee, e2) in case one of the preceding verification checks is negative, the call of the payer is not accepted or accepted after a delay by the processing unit, and/or an acoustic announcement conveying the message that payment has not been effected is made.

According to a refinement of the method according to the present invention, the following steps are conducted in such a way that:

a) the transmission of the data of the payee to the processing unit is also effected by means of the initiation of a telephone call to the processing unit by the payee, the dialed telephone number containing a digit sequence corresponding to the amount to be paid, b1) in case of positive verification by the verification unit and transaction unit, the confirmation signal, following an effected payment, is transmitted to the payee through the acceptance of the payee's call by the signaling unit and, optionally, an acoustic announcement conveying the message that payment has been effected is made.

b2) in case one of the preceding verification checks is negative, the call of the payee is also not accepted or accepted after a delay, and/or an acoustic announcement conveying the message that payment has not been effected is made.

The processing unit or the transaction unit are advantageously comprised or operated by a telecommunications provider. An advantage of the embodiment of the method illustrated above is that it is possible to effect a very simple integration of the payment transactions into the billing systems of the telephone or mobile telephone providers. The processing of the payment transactions advantageously occurs together with the billing of the telecommunications services.

The method according to the invention also results in the further advantage that an itemized telephone or mobile telephone bill of the telecommunications provider can act directly as proof of payment and receipt without any modification. This leads to a cost reduction, as it is no longer necessary to create and send a separate invoice. An entry pertaining to a call made to the telephone number "0800-55555-2350-4567" with a duration of 11 seconds could thus act as proof of a payment received for an amount of EUR 23.50. This feature of the present invention according to which both transaction parties initiate a call to the processing unit has the advantage that a receipt exists for each of the transaction parties.

In this connection it should be noted that calls to toll-free call numbers, which usually begin e.g. with 0800, are generally not listed on the itemized bill of the caller. In this case, processing would have to be effected using an alternative access number. On the other hand, the party called, in this case the operator of the processing unit, is generally billed for calls to toll-free numbers so that the calls in question would be listed on the itemized bill of the processing unit. Thus, the itemized bill of the telecommunications provider would also function as a proof of payment and receipt, however not for the transaction parties, but rather for the operator of the processing unit.

According to a further preferred embodiment of the method according to the present invention, an announcement or other signaling and/or PIN query or other query is effected in cases in which a set amount is exceeded or under other set conditions so as to confirm the transaction before it is conducted.

The response of the signaling unit regarding the conducted transaction can advantageously be safeguarded against manipulation by transmitting a unique accounting reference code or a cryptographically signed confirmation message, e.g. by e-mail or by SMS.

The method could further be realized in e.g. such a way that the call is accepted by the processing unit by picking up exclusively in cases of successful transactions, and a call connected and/or busy signal is signaled in cases of unsuccessful transactions. This variant would have the advantage that transactions would generally lead to entries in itemized bills if (and only if) they are successful. In this variant a call-back, together with an acoustic announcement of the cause of the error, to one or all of the transaction parties could be initiated by the signaling unit in cases of unsuccessful transactions. Alternatively, the cause of error could be transmitted e.g. by SMS.

The system according to the present invention for initiating and/or conducting a transaction that is associated with at least two corresponding declarations of intent, in particular a payment transaction, comprises a first communication device associated with a first transaction party, a second communication device associated with a second transaction party, and a processing unit capable of receiving the data of the two communication devices. The processing unit comprises a verification unit or is connected to a verification unit. With the latter it is possible to examine whether correlating the transaction parties is possible on the basis of the data transmitted by the communication devices within a limited time frame.

Finally, according to the present invention, a computer system for initiating and/or conducting a payment transaction is provided. The computer system relates in particular to an embodiment of the aforementioned processing unit. The computer system comprises an input for receiving data of a first and of a second communication device, the data containing features that permit correlating two corresponding declarations of intent. Connected to the input is a transaction pool memory, which stores the data incoming within a time interval. Connected to the transaction pool memory is a verification unit with which the data stored in the transaction pool memory can be analyzed in such a way that at least identifiers of a first and of a second communication device and an amount to be paid can be extracted, and with which it can be examined whether or not correlating the transaction parties is possible on the basis of the data transmitted and whether the respective declarations of intent correspond. Connected to the verification unit is a transaction unit with which the data extracted at the verification unit can be converted into payment order data in case of positive verification. Finally, the transaction unit is connected to an output through which the payment order data can be transmitted to a payment processing unit.

According to a preferred refinement of the computer system according to the present invention, connected to the transaction unit and to the output is a signaling unit, with which signals pertaining to the initiation or conducting of the payment transaction, depending on the examination of the verification unit and/or on the transmission of the payment order data, can be transmitted to at least one communication device or other receivers.

Also, the transaction unit can comprise an account-keeping unit or can be directly connected to an account-keeping unit. If billing is effected e.g. using a "stored value account", i.e. a prepaid credit, settlement, i.e. conducting the payment transaction, can be conducted particularly efficiently, quickly and without risk, as no communication connection to an external processing unit is necessary, no extensive transaction records have to be administered, while credit, collection and chargeback risks are precluded.

The communications devices are in particular a land line telephone and/or mobile telephone.

Moreover, the invention comprises a computer program with program code means in order to conduct all steps of the aforementioned embodiments of the method according to the invention when the program is executed on a computer. Finally, the invention comprises a computer program product with program code means that are stored on a computer-readable data medium in order to conduct the different embodiments of the method indicated above when the program product is executed on a computer.

BRIEF DESCRIPTION OF THE DRAWINGS

In the following, embodiments of the method according to the present invention are illustrated with reference to the drawings.

DETAILED DESCRIPTION OF THE INVENTION

Figure 1:
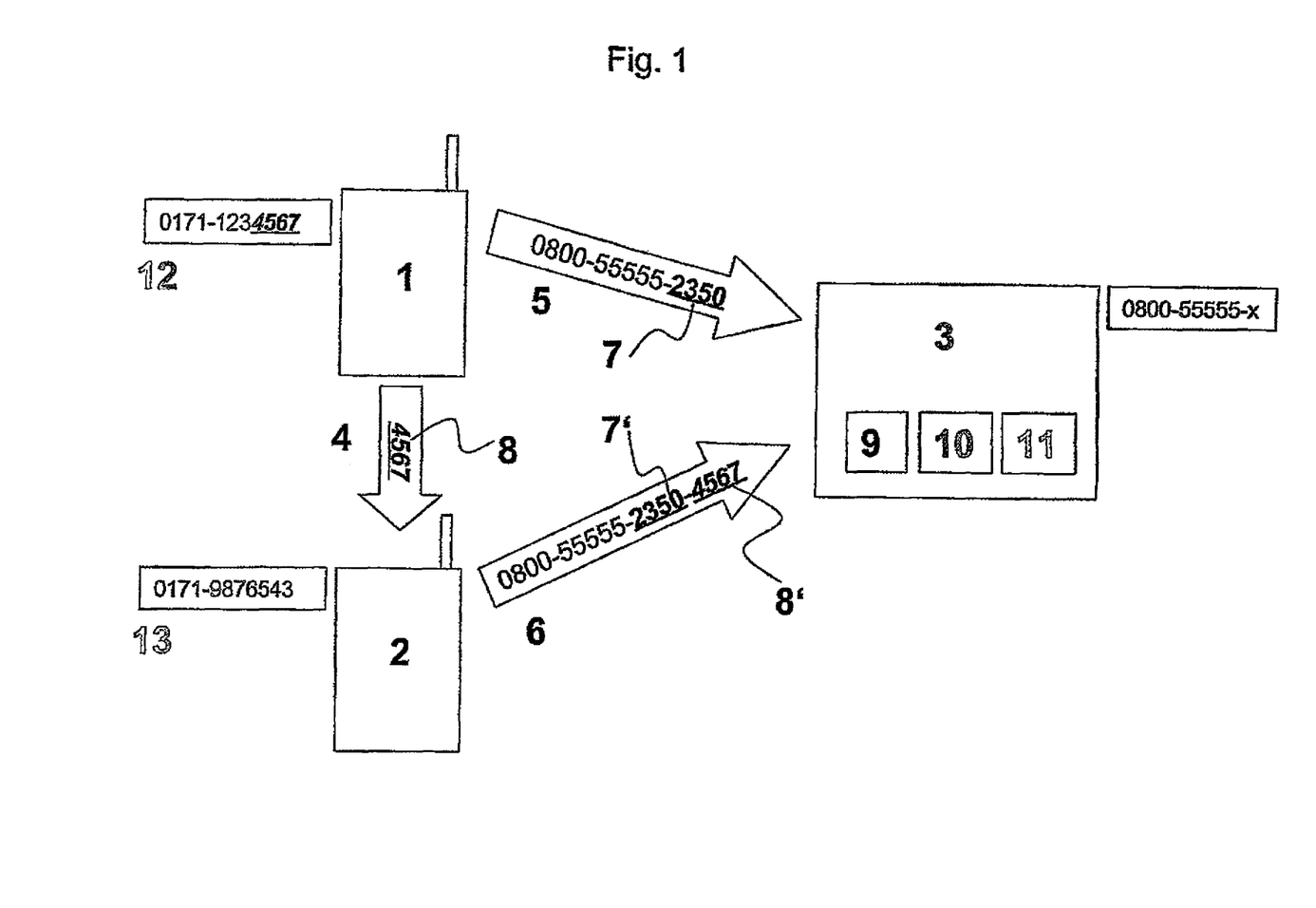
FIG. 1 shows a diagram illustrating the first embodiment of the method according to the present invention.

The first embodiment is illustrated with reference to FIG. 1:

The transaction parties comprise a payer 1 (and/or a communication device of the payer) and a payee 2 (and/or a communication device of the payee). The payer 1 initiates a telephone call 5 to the processing unit 3, the telephone number dialed containing a digit sequence 7 corresponding to the amount to be paid. Simultaneously with or shortly before or after the call of the payer, the payee 2 transmits data containing the amount to be paid 7 to the processing unit 3. The time interval lies in a range between 10 and 30 seconds, and is e.g. 20 seconds. The payee 2 additionally transmits a payment correlation reference code 8 to the processing unit 3, which is formed according to a set rule from the telephone number 12 of the payer 1 (e.g. consists of the last four digits of the telephone number of the payer). A verification unit 9 examines whether the data transmitted by payer 1 and payee 2 can be uniquely correlated and whether at least the amounts to be paid 7 contained therein correspond. A transaction unit 10 examines, on the basis of the data transmitted, whether it is possible to identify and/or authenticate payer 1 and payee 2 and/or whether it is possible to process the payment transaction.

For this purpose it is first examined whether the numbers of the participants are registered in the system and authorized for use in the payment function. In cases of negative verification, the signaling unit 11 sends a corresponding error message to the respective parties. This can be effected e.g. by accepting the calls and making an acoustic announcement.

In case of positive verification the transaction unit 10 examines in the next step whether it is possible to conduct the payment. This depends in particular on the amount involved and the credit rating of the payer. If e.g. the current amount to be paid or an aggregate sum of amounts to be paid exceeds a limit (that e.g. depends on the credit rating of the payer), the transaction unit 10 can refuse to conduct and/or further process the payment, or conduct a supplementary authentication check by requesting a further authorization feature (e.g. entry of a PIN via an IVR interface). The transaction unit 10 can generally request yet a further confirmation (also e.g. by simply pressing a button and transmitting a DTMF tone) in certain circumstances, e.g. when a certain amount is exceeded. Furthermore, it is e.g. also possible that in certain circumstances, such as e.g. when a certain amount is exceeded, the amount is explicitly announced once more before the transaction is conducted, and confirmation is then requested.

In case of positive verification by the verification unit 9 and transaction unit 10, the transaction unit 10 conducts or initiates the processing of the payment. The call of the payer 1 is accepted by the signaling unit 11 and, optionally, an acoustic announcement conveying the message that payment has been effected is made. A confirmation signal pertaining to the successful payment is transmitted to the payee 2. In case one of the preceding verification checks is negative, the call of the payer 1 is not accepted or accepted after a delay by the processing unit 3, and/or an acoustic announcement conveying the message that payment has not been effected is made.

A further refinement of this first embodiment is as follows:

The transmission of the data of the payee 2 to the processing unit 3 is also effected by means of the initiation of a telephone call 6 to the processing unit 3 by the payee. The dialed telephone number also contains a digit sequence 7' corresponding to the amount to be paid, as well as the payment correlation reference code as the digit sequence 8', e.g. the last four digits 8 of the telephone number 12 of the caller 1. In case of positive verification by the verification unit 9 and transaction unit 10 following a successful payment, the confirmation signal is also transmitted to the payee 2 by means of the acceptance of the payee's call 6 by the signaling unit 11 and, optionally, an acoustic announcement conveying the message that payment has been effected is made. In case one of the preceding verification checks is negative, the call of the payee is also not accepted or accepted after a delay, and/or an acoustic announcement conveying the message that payment has not been effected is made.

In the following, the conducting of a payment transaction is illustrated with a detailed example:

Party A (1), who has a mobile telephone with the mobile telephone number 0171-1234567 (12), would like to pay the amount of EUR 23.50 (7) to Party B (2), who has the mobile telephone with the mobile telephone number 0171-9876543 (13). For this purpose Party A discloses the last four digits of his mobile telephone number (8), thus "4567" (4), to Party B. Using his mobile telephone, A dials the number 0800-55555-2350 (5). Practically simultaneously and using his mobile telephone, B dials the number 0800-55555-2350-4567 (6). If the payment is conducted successfully, the calls are accepted, and A and B receive a short acoustic announcement "Payment effected".

The method can also be designed in such a way that it is not the payer who discloses the last four digits of his mobile telephone number to the payee, while the payee transfers these—as part of the called number—to the processing unit, but rather the other way around, i.e. in such a way that the payee discloses the last four digits of his mobile telephone number to the payer, and the payer transmits these—as part of the called number—to the processing unit.

Both variants can be combined, i.e. the payer and payee mutually disclose the last two digits of their respective mobile telephone numbers, and each transmits the two digits received from the other party—as part of the called number —to the processing unit.

This could be carried out as follows: A discloses the digits "67" to B, B discloses the digits "43" to A. A dials "0800-55555-2350-43", B dials "0800-66666-2350-67". In this case, the dialing of the different main telephone numbers, "0800-55555" as opposed to "0800-66666", by the transaction parties is necessary to distinguish payer from payee. Otherwise, the method operates analogously.

In detail, the processing unit and other units work as follows:

The processing unit 3 can be reached at the main telephone number 0800-55555. At first the incoming calls are registered by the processing unit 3. Advantageously, the mobile telephone numbers 12 and 13 of the callers (MSISDN and/or ANI) are automatically transmitted with the incoming calls. The significant parts "2350" (7) and/or "23504567" (7' and 8') are extracted from the dialed telephone numbers (DNIS). From these the processing unit derives the transaction data sets (participant number=0171-1234567; function=send; amount=23.50; sender-identifier=4567) as well as (participant number=0171-9876543, function=receive; amount 23.50; sender identifier=4567). The transaction data sets are put into a transaction pool of transactions to be correlated. Those data sets for which no other correlatable data set was found within the time interval, for example, within 20 seconds, are deleted from the transaction pool.

The verification unit 9, which is comprised by or connected to the processing unit 3, examines whether it possible to correlate the transaction parties 1 and 2 on the basis of the transmitted data. In the current example of a payment transaction this involves an examination of whether the respective declarations of intent correspond. This is accomplished by way of a comparison of the data sets in the transaction pool with regard to matching fields "amount" and "sender-identifier" (7 and 8 compared with 7' and 8'). As the supplementary criterion of practical simultaneity keeps the transaction pool very small at all times, it is very probable even in cases of a heavy transaction load that correlating is possible on the basis of the criteria "amount" and "sender identifier" alone.

In the rare cases in which a unique correlation is not possible because several data sets with corresponding criteria are present in the transaction pool, the processing unit will request the entry of additional features, e.g. will ask the payer 1 via an IVR system (Interactive Voice Response) to enter the last four digits of the mobile telephone number of the recipient.

In the first example illustrated above, it was assumed that the mobile telephone numbers of the callers (MSISDN and/or ANI) are transmitted automatically, which simplifies processing and brings about protection against misuse. This transmission can be achieved e.g. with a special set-up of the telecommunications provider on the side of the processing unit, which makes it possible to display those caller IDs which are usually suppressed. This has the advantage that callers with standard caller ID suppression can also use the system without changing the presentation mode every time.

Alternatively, the method can be designed in such a way that the retrieval of identification features (e.g. the mobile telephone number in combination with a PIN or a free customer number not correlated with a mobile telephone number) is effected by means of an IVR system in cases of calls from mobile telephone numbers with suppressed caller ID. The embodiment of free customer numbers that are not linked to a mobile telephone number offers the users of the system the option of realizing additional anonymity vis-à-vis the processing unit.

Figure 2:
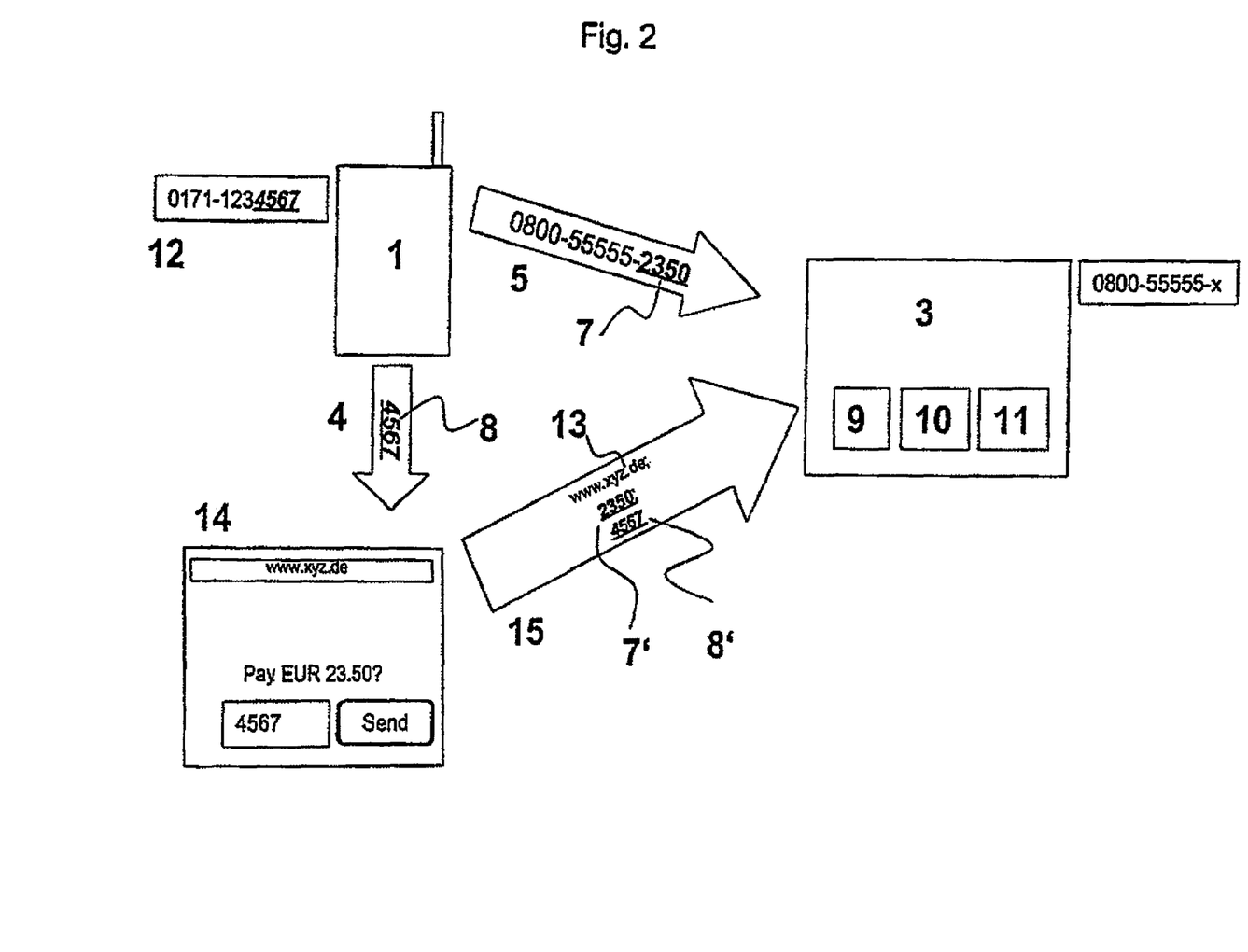
FIG. 2 shows a diagram illustrating the second embodiment of the method according to the present invention.

In the following, a second embodiment is described with reference to FIG. 2 in an e-commerce scenario, in which a payment transaction, in which a payer effects a payment to e.g. a goods and services provider, is conducted via the Internet.

The payer with the mobile telephone number 0171-1234567 enters the last four digits 8 of his mobile telephone number, thus "4567", on the web page 14 of the provider on which the amount to be paid, e.g. EUR 23.50, is displayed, and simultaneously dials the number "0800-55555-2350" on his mobile telephone 1. In principle the processing of the method is effected analogously to the first embodiment illustrated above, with the difference that the data transmission from the computer system of the provider to the processing unit 3 occurs e.g. via an HTTP request 15 or the invoking of a web service. During this step the computer system of the provider transmits an identifier of its identity 13, the amount 7' as well as the last four digits 8' of the mobile telephone number 12 of the payer. The return signal from the signaling unit to the computer system of the provider can, in turn, occur via an HTTP response or the return value of the web service. Advantageously, the data transmission between the computer system and the processing unit 3 and/or the signaling unit 11 is additionally secured by cryptographic methods.

The following describes a third embodiment for conducting and documenting the conclusion of a contract, combined with the conducting of a payment transaction. Principally, the third embodiment works analogously to the e-commerce scenario of the second embodiment described above. It relates to a payment transaction in the Internet in which a payer conducts a payment to e.g. a goods and services provider. In this example, however, in addition to a simple payment from the payer to the provider, a sale or service agreement between the provider and the payer is to be completed and documented. The payer is thus designated as the payer/buyer in the following.

For this purpose a digital digest of the content of the contract is made, e.g. by means of a hash algorithm such as MD5. The digital digest can e.g. consist of a cross sum or check sum or a part of credit card number, or contain the so-called CVC code complementarily correlated with the credit card number. The digital copy is advantageously reduced to a relatively short, e.g. six-digit sequence (e.g. "141516"). This six-digit sequence is indicated to the payer/buyer on the web page and/or sent to the payer/buyer e.g. by e-mail.

Additionally and/or alternatively, the content of the agreement can be stored and recorded permanently by e.g. sending an e-mail with the terms of the agreement to the payer/buyer, the e-mail containing a reference number of the agreement. The reference number can also consist of e.g. a six-digit sequence (e.g. "949596") and advantageously include the date, time and other data.

In this scenario, which deviates here from the e-commerce scenario described above, the payer/buyer now also transmits (in addition to the amount) the reference number to the processing unit, e.g. by dialing the telephone number ("0800-55555-2350") extended by said six digits, thus "0800-55555-2350-949596".

Alternatively, the digital digest can be also be transmitted e.g. as part of the called number by dialing "0800-55555-2350-141516".

Alternatively, both the digital copy and the reference number can be transmitted.

Alternatively, the transmission of the amount to be paid is not required.

Alternatively, the part of the described method specific to payment can be left out and the method used solely for conducting and/or documenting the completion of an agreement. For example, payment can be effected with a conventional credit card, and the credit card payment including the credit card data can be part of the completed agreement.

All data can also be entirely or partially transmitted by DTMF tones or by SMS or another method.

A high degree of security with regard to the documentation and provableness of the completed agreement is achieved with the illustrated embodiments of the method. By transmitting the data of the digital digest and/or the reference number, in parallel to via the Internet, via the mobile telephone of the user, the data are, all in all, safeguarded against manipulation in the Internet.

In addition, the system-immanent security advantages of the use of mobile telephones for e-commerce and/or m-commerce transactions known according to the state of the art are brought to bear (possession and/or physical access to a mobile telephone, security through SIM card PIN and/or device PIN).

Moreover, the receipt function of the itemized bill of the telecommunications provider described above can be utilized (provided the data is transmitted as part of the call number).

In the method an implementation of billing functionality can be effected e.g. simply by directly billing the call with which the payment transaction is executed with the amount contained in the telephone number, provided the duration of the connection is longer than e.g. 10 seconds. A connection to the call number 0800-55555-2350 with a duration of e.g. 11 seconds would then be charged with an amount of EUR 23.50, while a connection to call number 0800-55555-2350-4567 with a duration of e.g. 11 seconds would be credited with an amount of EUR 23.50. This functionality could be implemented with minimal software updates in the billing systems. Merely a few technical upgrades and interfaces would have to be put in place. Advantageously, the method works in a symmetrical fashion for payer and recipient alike—unlike conventional methods, in which the systems and interfaces employed on the side of the recipient are different from those used on the side of the payer.

Figure 3:
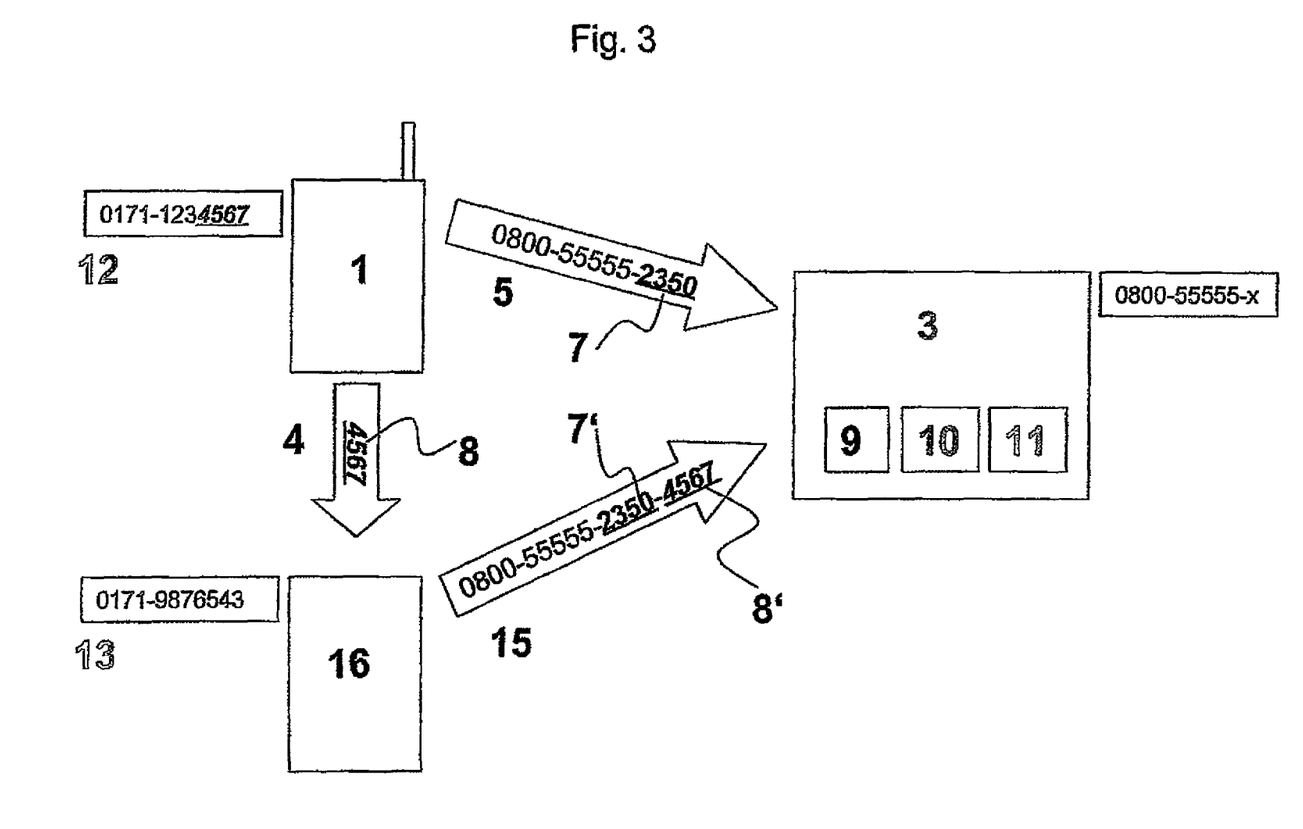
FIG. 3 shows a diagram illustrating the fourth embodiment of the method according to the present invention.

In the following, a fourth embodiment is illustrated with reference to FIG. 3. This example relates to an implementation variant particularly suitable for use in POS (point-ofsale) terminals, which, instead of an Internet connection, generally only have access to land line telephone connections for the communication of credit card terminals or comparable devices with an authorization centre.

The customer discloses the last four digits 8 of his mobile telephone number 12 to the cashier. The cashier enters said four digits 8 into a cash register or a credit card terminal 16 or comparable device (called "terminal" in the following), which transfers it to a connected or integrated land line or mobile wireless modem, which initiates a telephone call to the processing unit, dialing the telephone number "0800-55555-2350-4567", as in the first embodiment. If the method variant of the first embodiment described above using a minimum duration of the connection as an indicator of a successful transaction is used, then a verification that the modem connection existed for longer than the minimum duration is principally sufficient for the terminal to ascertain whether or not the payment was successful. This way the processing of the method can be accelerated considerably vis-à-vis protocols in which the time-consuming establishment of a modem protocol connection is effected. This also results in a reduction of the telecommunications costs. A detailed response from the processing unit to the point of sale is generally not necessary in cases of error, as the payer and/or customer receives acoustic feedback on the cause of the error.

In the following, variants are described that can be implemented in conjunction with the above embodiments:

As already described above, in cases in which the data transmission to the processing unit 3 is effected via mobile telephone calls, the method is designed in such a way that a part of the processing steps are already executed before the call is accepted by the processing unit, and, further, in such a way that the duration of a connection of a successful transaction differs from that of an unsuccessful transaction.

Finally, the first embodiment illustrated above could be modified as follows: instead of the signaling of a call connected signal during the processing of the transaction, the calls of the payer and payee, directly after their arrival at the processing unit, are rejected by the processing unit by means of a special signaling message to the switching centre, by means of which e.g. a busy signal sounds at the payer's and the payee's end. A few seconds later, the payer and recipient receive an incoming call from the signaling unit, while the caller ID generated by the signaling unit has the special telephone number (ANI) "0800-55555-2350" if payment has been effected, and/or "0800-55555-0000" if the payment could not be conducted. The payer and recipient can thus see from the caller ID shown on the display whether or not the payment was successful. Advantageously, the entry remains stored on the caller list of the mobile telephone, which facilitates verification again at a later point in time. An advantage of this variant as opposed to signaling by sending an SMS is the faster and guaranteed short duration of transmission.

Furthermore, embodiments of the method are possible in which a telephone connection is established between the two transaction parties (provided both transaction parties are using a land line telephone or mobile telephone). This variant is particularly suitable when e.g. a payment transaction for a telephone consultation or the like is effected and the service is rendered immediately via the established telephone connection.

In cases in which a payment transaction is to be effected e.g. over an established mobile telephone connection between the transaction parties using mobile telephones, the method described in the first embodiment could be modified in such a way that the transmission of the amount to be paid and the last four digits of the mobile telephone number of the payer is effected by means of DTMF tones emitted via the connection by the transaction parties. In this case the DTMF tones could be filtered out by the switching centre and relayed to the processing unit, or a temporary telephone connection between the transaction parties and the processing unit could be initiated.

Figure 4:
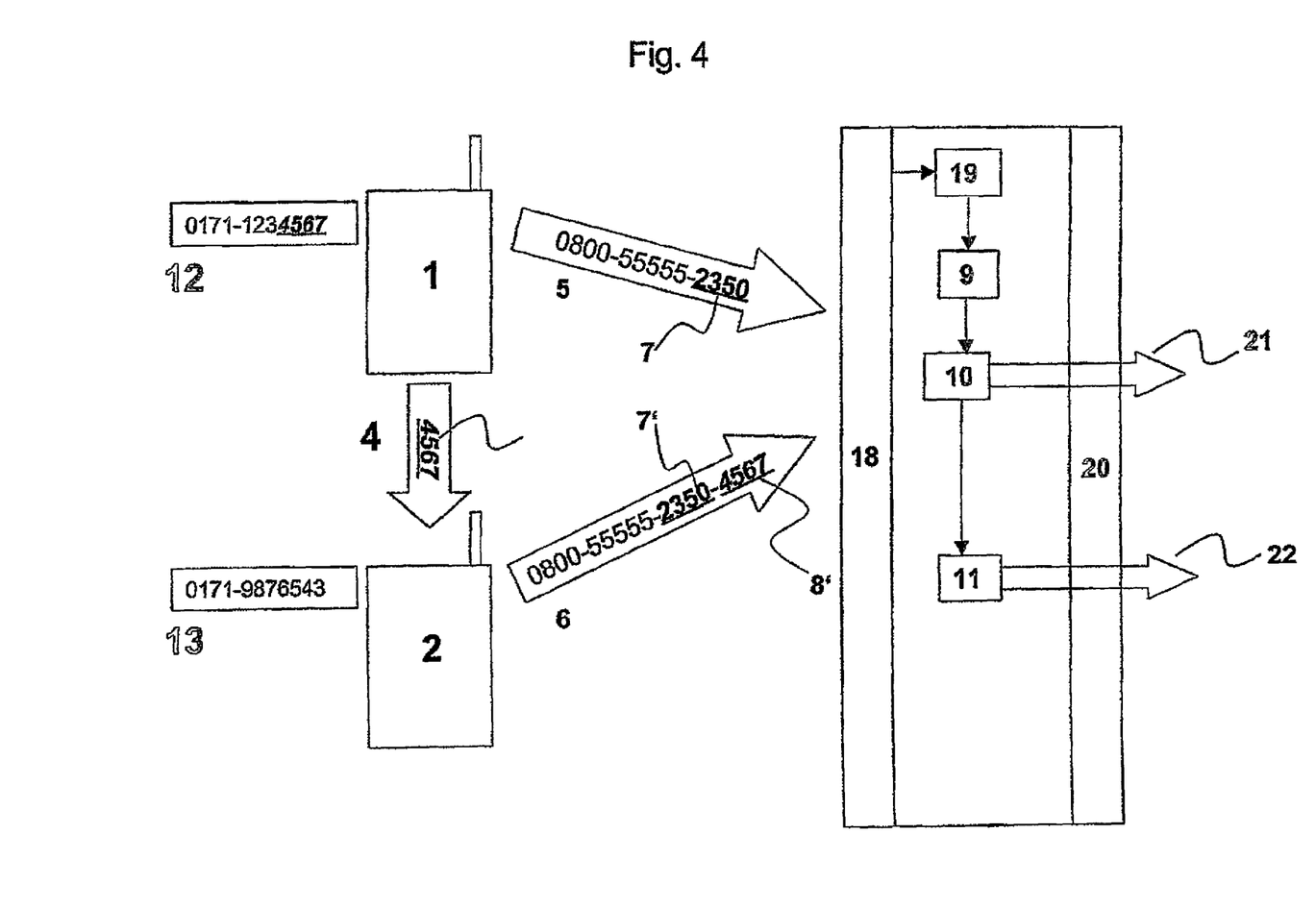
FIG. 4 shows a diagram illustrating an embodiment of the system according to the present invention.

In the following, an embodiment of the computer system and/or processing unit is described with reference to FIG. 4.

As already illustrated in the first embodiment, the mobile telephones 1 and 2 of a payer and of a payee transmit contemporaneously the telephone calls 5 and 6 to the computer system. The telephone numbers used when dialing contain the amount 7 and/or 7' for the payment transaction. Further, one telephone number contains a reference 8' to the telephone number of the other party.

The computer system is, for example, integrated in a system of the telecommunications provider. It is provided with an input 18, which can record the dialed numbers of incoming calls without having to accept the calls 5 and 6 immediately. The input 18 relays these data into the transaction pool memory 19. Connected with the transaction pool memory 19 is a verification unit 9. When a data set arrives, the verification unit examines whether another data set of the transaction pool memory 19 can be correlated with this data set. For this purpose it extracts from a call at least the identifier of the caller who made the call and from the dialed number the amount to be paid as well as, optionally, the payment correlation reference code 8'. The verification unit 9 then examines whether the identifiers of the telephones via which the calls 5 and 6 were made are stored in a database of the computer system. Using the databank, the computer system can obtain a link to registered users and their data for the payment transaction. For example, bank account details or credit card numbers can be ascertained for the users. Moreover, the verification unit 9 examines whether the declarations of intent contained in the calls correspond. In the present example, the verification unit 9 examines whether the payment correlation code 8' actually corresponds to the last four digits of the telephone number of the other call 5. If all verification checks are positive, the verification unit 9 transmits the data to the transaction unit 10 connected to it, and the data sets are removed from the transaction pool memory 19.

If no other data capable of being correlated with an incoming data set are found in the transaction pool memory 19, then all data sets that have been contained in the transaction pool memory 19 for longer than the stipulated interval are deleted from the transaction pool memory 19. The transaction pool memory 19 thus comprises a database, in which contemporaneously incoming calls are stored, and with which incoming data sets can be examined so as to ascertain whether or not data sets can be correlated to one another.

The transaction unit 10 can convert these data into payment order data 21. These are, for example, instructions relating to the debiting of an account of the payer, as well as, in parallel, to the transfer of a certain amount to an account of the payee. The transaction unit 10 transmits the payment order data 21 in this case, for example, via an internet connection to the bank of the processing unit and/or the banks of the payer and the payee. For this purpose an output 20 is provided.

Moreover, a signal unit 11 can be connected to the transaction unit 10 and to the output 20. In cases in which payment order data 21 have been transmitted, the signaling unit 11 emits signals 22 pertaining to the initiation of the payment transaction to the telephone 1 of the payer and/or to the telephone 2 of the payee. Further, the signals 22 can be sent to other recipients; for example, stored e-mail addresses of the payer and payee. Finally, the signaling unit 11 can also send signals 22 pertaining to an unsuccessful transaction. Moreover, the signals 22 can also be sent upon positive verification of the verification unit 9. The signals 22 can be effected as illustrated with reference to the first embodiment.

Thus, for the payment transaction with the computer system, there are only two entries to be conducted on the part of the payer and of the payee: the payer discloses a part of his telephone number to the payee, who activates the payment application on his mobile telephone 2 and enters this part 8 of the telephone number into his mobile telephone 2. Thereupon the payer also activates the payment transaction application on his mobile telephone 1. Both parties then enter the amount to be paid 7 and/or 7' in the application of the mobile telephones 1, 2 and more or less simultaneously press a button for the initiation of the payment transaction. The applications on the mobile telephones 1 and 2 then automatically generate the telephone numbers 5 and 6 and send these to the computer system. The computer system then initiates the payment transaction by transmitting the payment order data 21 to the bank of the payer. Furthermore, the payment transaction is documented by the computer system.

Having described the invention, the following is claimed:

1. Method for a payment transaction between a payer and a payee using (1) two communication devices respectively associated with data transmissions by the payer and the payee and (2) a processing unit, wherein a spatial proximity exists between payer and payee, and location information of the payer is transmitted and evaluated, the method comprising:
   the payer's communication device transmits data to the processing unit that contain a reference to a declaration of intent that is at least directed to conducting a payment transaction associated with money or value units;
   using the processing unit to derive a transaction data set and an identifier of the payer from the data transmitted by the payer, and to put, using the information on the location of the payer as an additional criterion, the transaction data set into a transaction pool, wherein a plurality of transaction data sets can be present in the transaction pool within a time frame of a predefined length;
   using the processing unit to determine whether uniquely correlating the transaction parties on the basis of a criterion using the identifier of the payer, and using the information on the location of the payer as an additional criterion, is possible because exactly one data set, and not more, with corresponding criteria is present in the transaction pool; and
   if it is determined that there exists exactly one transaction data set, and not more, with corresponding criteria, said transaction data set is selected and the payment transaction is conducted according to said selected transaction data set.

2. Method for a payment transaction between a payer and a payee using (1) two communication devices respectively associated with data transmissions by the payer and the payee and (2) a processing unit, wherein a spatial proximity exists between payer and payee, and location information of the payer is transmitted and evaluated, the method comprising:
   the payer's communication device transmits data to the processing unit that contain a reference to a declaration of intent that is at least directed to conducting a payment transaction associated with money or value units;
   using the processing unit to derive a transaction data set and an identifier of the payer from the data transmitted by the payer, and to put, using the information on the location of the payer as an additional criterion, the transaction data set into a transaction pool, wherein a plurality of transaction data sets can be resent in the transaction pool within a time frame of a predefined length;
   using the processing unit to determine whether uniquely correlating the transaction parties on the basis of a criterion using the identifier of the payer, and using the information on the location of the payer as an additional criterion, is not possible because several data sets with corresponding criteria are present in the transaction pool; and
   if it is determined that there exists exactly one transaction data set, and not more, with corresponding criteria, said transaction data set is selected and the payment transaction is conducted according to said selected transaction data set.

3. A system for a payment transaction between a payer and a payee, wherein a spatial proximity exists between payer and payee, and location information of the payer is transmitted and evaluated, the system comprising:
   two communication devices respectively associated with data transmissions by the payer and the payee; and
   a processing unit for receiving data transmitted by the payer's communication device that contains a reference to a declaration of intent that is at least directed to conducting a payment transaction associated with money or value units, said processing unit being adapted to derive a transaction data set and an identifier of the payer from the data transmitted by the payer, and to put, using the information on the location of the payer as an additional criterion, the transaction data set into a transaction pool, wherein a plurality of transaction data sets can be present in the transaction pool within a time frame of a predefined length,
   wherein it is determined, using the processing unit, whether uniquely correlating the transaction parties on the basis of a criterion using the identifier of the payer, and using the information on the location of the payer as an additional criterion, is possible because exactly one data set, and not more, with corresponding criteria is present in the transaction pool, and
   if it is determined that there exists exactly one transaction data set, and not more, with corresponding criteria, said processing unit selects said transaction data set and the payment transaction is conducted according to said selected transaction data set.

4. A computer-executable program code tangibly embodied in a non-transitory computer-readable storage medium, comprising instructions for causing a processing unit to:
   receive data from a payer's communication device that contains a reference to a declaration of intent that is at least directed to conducting a payment transaction with a payee, said declaration of intent associated with money or value units;
   receive location information from the payer's communication device;
   derive a transaction data set and an identifier of the payer from the data transmitted by the payer, and put, using the information on the location of the payer as an additional criterion, the transaction data set into a transaction pool, wherein a plurality of transaction data sets can be present in the transaction pool within a time frame of a predefined length;
   enable determining whether uniquely correlating the transaction parties on the basis of a criterion using the identifier of the payer, and using the information on the location of the payer as an additional criterion, is possible because exactly one data set, and not more, with corresponding criteria is present in the transaction pool; and if it is determined that there exists exactly one transaction data set, and not more, with corresponding criteria, enable selecting said transaction data set and conducting the payment transaction according to said selected transaction data set.

* * * * *